(12) United States Patent
Sheng et al.

(10) Patent No.: US 8,860,500 B2
(45) Date of Patent: Oct. 14, 2014

(54) CHARGE TRANSFER APPARATUS AND METHOD

(71) Applicant: Analog Devices Technology, Hamilton (BM)

(72) Inventors: Linus Sheng, Shanghai (CN); Christopher W. Mangelsdorf, Encinitas, CA (US)

(73) Assignee: Analog Devices Technology, Hamilton (BM)

( * ) Notice: Subject to any disclaimer, the term of this patent is extended or adjusted under 35 U.S.C. 154(b) by 0 days.

(21) Appl. No.: 13/945,978

(22) Filed: Jul. 19, 2013

(65) Prior Publication Data

US 2014/0022007 A1    Jan. 23, 2014

Related U.S. Application Data

(60) Provisional application No. 61/673,941, filed on Jul. 20, 2012.

(51) Int. Cl.
*G05F 3/02*    (2006.01)

(52) U.S. Cl.
CPC .......................... *G05F 3/02* (2013.01)
USPC .......................................................... 327/536

(58) Field of Classification Search
USPC ......... 327/536, 534, 537, 538, 540, 541, 543, 327/589, 390
See application file for complete search history.

(56) References Cited

U.S. PATENT DOCUMENTS

| | | | |
|---|---|---|---|
| 6,026,003 A * | 2/2000 | Moore et al. .................... | 363/60 |
| 6,037,622 A * | 3/2000 | Lin et al. ........................ | 257/299 |
| 7,256,640 B2 | 8/2007 | Ucciardello et al. ........... | 327/536 |
| 7,256,641 B2 | 8/2007 | Namekawa et al. ........... | 327/536 |
| 7,532,061 B2 | 5/2009 | Ragone et al. ................ | 327/536 |
| 7,595,682 B2 | 9/2009 | Lin et al. ....................... | 327/536 |
| 2003/0214346 A1* | 11/2003 | Pelliconi ....................... | 327/536 |

* cited by examiner

*Primary Examiner* — Lincoln Donovan
*Assistant Examiner* — Jung H Kim
(74) *Attorney, Agent, or Firm* — Sunstein Kann Murphy & Timbers LLP

(57) ABSTRACT

An apparatus for transferring charge has a first charge pump path with a plurality of stages having first capacitors, and a second charge pump path, also with a plurality of stage having second capacitors, in parallel with the first charge pump path. The first and second charge pump paths are coupled to share a common output node. The apparatus also has a timing circuit coupled with the first and second charge pump paths. Among other things, the timing circuit is configured to cause at least one of the first capacitors to periodically charge at least one of the second capacitors.

19 Claims, 10 Drawing Sheets

CHARGE TRANSFER APPARATUS AND METHOD

PRIORITY

This patent application claims priority from provisional U.S. patent application No. 61/673,941, filed Jul. 20, 2012, entitled, "CHARGE TRANSFER APPARATUS AND METHOD," and naming Christopher W. Mangelsdorf and Linus Shen as inventors, the disclosure of which is incorporated herein, in its entirety, by reference.

FIELD OF THE INVENTION

The invention generally relates to charge pumps and, more particularly, the invention relates to reducing the energy loss in charge pumps.

BACKGROUND OF THE INVENTION

Traditional multistage charge pumps typically include a network of switched capacitors that boost an input voltage to a higher output voltage, and transfer charge from its input to its output. One important measure of such a charge pump is its power efficiency, which is limited by its output resistance.

Specifically, a high output resistance reduces the power efficiency. Those skilled in the art have responded to this problem by increasing the capacitance of the switched capacitors within the charge pump. Such a solution, however, takes more of the limited chip area that could be available for the circuit. Accordingly, the overall circuit size may increase or have less functionality. Those in the art have also responded to this high output resistance/power efficiency problem by increasing the drive frequency, which undesirably can cause further power loss by driving parasitic capacitance.

SUMMARY OF VARIOUS EMBODIMENTS

In accordance with one embodiment of the invention, an apparatus for transferring charge has a first charge pump path with a plurality of stages having first capacitors, and a second charge pump path, also with a plurality of stage having second capacitors, in parallel with the first charge pump path. The first and second charge pump paths are coupled to share a common output node. The apparatus also has a timing circuit coupled with the first and second charge pump paths. Among other things, the timing circuit is configured to cause at least one of the first capacitors to periodically charge at least one of the second capacitors.

The first charge pump path has at least two first stages, while the second charge pump path also has at least two corresponding second stages. It that case, each stage of the first charge pump path may have a corresponding stage of the second charge pump path with a common input node and a common output node. Moreover, on these or similar embodiments, the timing circuit may be configured to charge at least one of the first capacitors in two or more consecutive steps.

The timing circuit may generate first and second clock signals for driving the charge pump paths. These first and second clock signals preferably are about ninety degrees out of phase. The timing circuit also may deliver the first clock signal to the first charge pump path, and an inverted version of the first clock signal to the second charge pump path. The inverted version is about 180 degrees out of phase with the first clock signal.

Various embodiments may have any number of stages. For example, the first charge pump path and second charge pump path may have three or more corresponding stages.

The timing circuit can be configured to charge a given one of the plurality of first capacitors in two or more consecutive charging steps before discharging. For example, before discharging, the timing circuit may be configured to cause the given capacitor to receive charge in a first charging step from one of the plurality of first capacitors, and receive charge in a second consecutive charging step from one of the plurality of second capacitors. In a similar manner, the timing circuit may be configured to charge a given one of the plurality of the first capacitors in three or more consecutive charging steps before discharging. To those ends, the timing circuit may be configured to generate and deliver a first clock signal to the first charge pump path. The timing circuit may be configured to divide each of a plurality of periods of the first clock signal into a total number of steps equaling two times the total number of charging steps. This total number of steps may be used to optimize charging, thus reducing energy loss.

In accordance with another embodiment, an apparatus for transferring charge has an input and an output, and a plurality of charge pump stages between the input and the output. Each stage has two switched capacitor arrangements, a common input node, and a common output node. The apparatus also has a timing circuit coupled with each of the plurality of charge pump stages. For a given charge pump stage, the timing circuit is configured to cause at least one of its two switched capacitor arrangements to receive charge from both switched capacitor arrangements of another charge pump stage.

In other embodiments, a method of transferring charge between an input and an output of a circuit provides a first charge pump path and a second charge pump path between an input and an output. The first and second charge pump paths form a plurality of stages that each have first and second switched capacitor arrangements, and each stage has a stage input and a stage output. The method transmits charge from a first switched capacitor arrangement of a transmitting stage to a first switched capacitor arrangement of a receiving stage. The first switched capacitor arrangement of the transmitting stage and receiving stage are part of the first charge pump path. After transmitting charge from a first switched capacitor arrangement of the transmitting stage and before discharging that charge from the first switched capacitor arrangement of the receiving stage, the method transmits charge from a second switched capacitor arrangement of the transmitting stage to the first switched capacitor arrangement of the receiving stage. The second switched capacitor arrangement of the transmitting stage preferably is part of the second charge pump path.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Rather than transferring a full amount of charge all at once across a charge transfer apparatus, illustrative embodiments transfer the full amount of charge, from its input to its output, in smaller amounts, favorably reducing energy loss across the apparatus. To that end, the circuit/apparatus has two channels of multi-stage charge pumps (referred to herein as "charge pump paths") that charge each other during the charge transfer process. Moreover, capacitive elements within the apparatus may be charged in multiple smaller, consecutive steps before discharging. Details of illustrative embodiments are discussed below.

Figure 1:
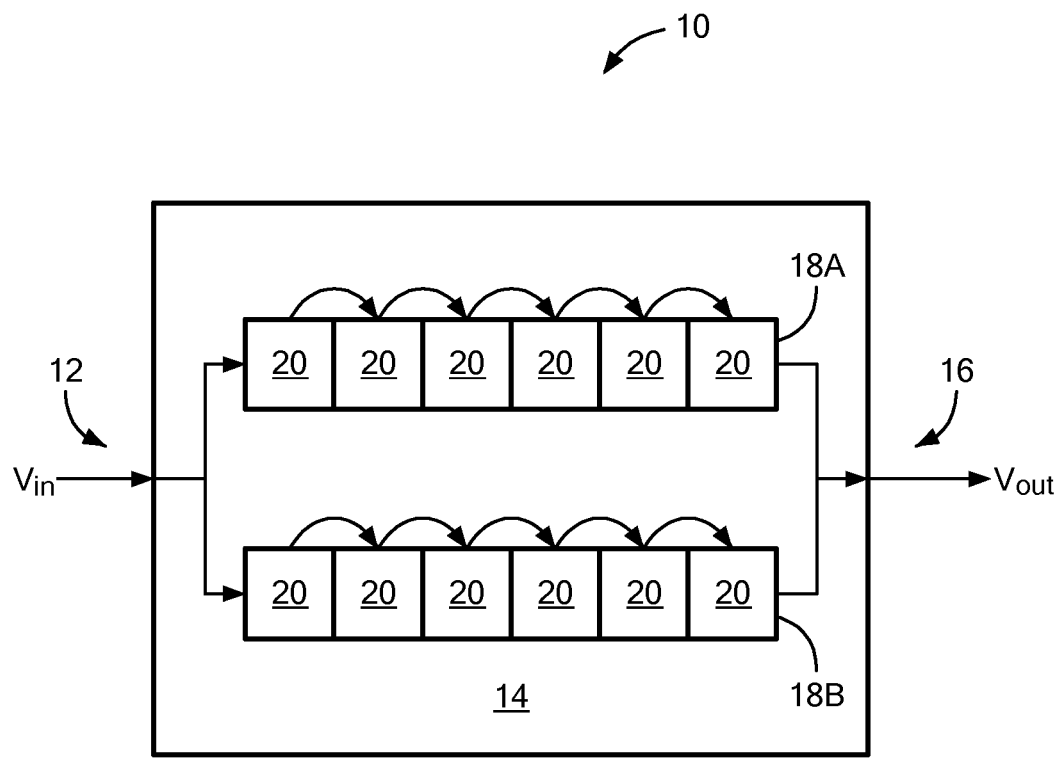
FIG. 1 schematically shows a generalized block diagram of a charge transfer circuit that may be configured in accordance with illustrative embodiments of the invention.

FIG. 1 schematically shows a generalized block diagram of a charge transfer circuit 10 (also referred to as a "charge pump apparatus 10") that may be configured in accordance with illustrative embodiments of the invention. Specifically, the charge transfer circuit 10 includes an input 12 for receiving an input voltage, a charge transfer block 14 for transferring the charge, and an output 16 for transmitting an output voltage. The charge transfer block 14 preferably includes at least two charge pump paths 18A and 18B connected in parallel between the input 12 and output 16. Each charge pump path 18A, 18B includes two or more stages 20 that cooperate to transfer the charge between the input 12 and the output 16. Although they preferably are in parallel, some embodiments may have multiple channels of charge pump paths 18A, 18B that are not connected in parallel. In addition to transferring charge/voltage, the charge pump illustratively boosts or reduces voltage between the input and output.

In the example shown, each charge pump path 18A, 18B has six stages 20 that each includes a switched capacitive arrangement (shown in greater detail in FIGS. 3-7, discussed below). Arrows between the stages 20 partially show how each stage 20 of a single charge pump path 18A or 18B receives charge from a prior stage 20 and forwards charge to a following stage. In addition, although not shown in FIG. 1, the two parallel charge pump paths 18A and 18B are configured to transfer charge between each other in a manner that reduces energy loss between the input 12 and the output 16. This inter-charge pump path charge transfer is discussed in greater detail below with regard to FIGS. 2-7.

The inventors recognized that in addition to energy losses caused by the output resistance, energy losses also increase with the square of the charge being transferred. Rather than attempting to modify the output resistance by increasing the size of the capacitors or increasing switching speed, which could necessitate more real estate needs or create increase parasitic capacitance, the inventors realized that they could improve energy efficiency by changing the way that charge is transferred between stages 20.

Figure 2A:
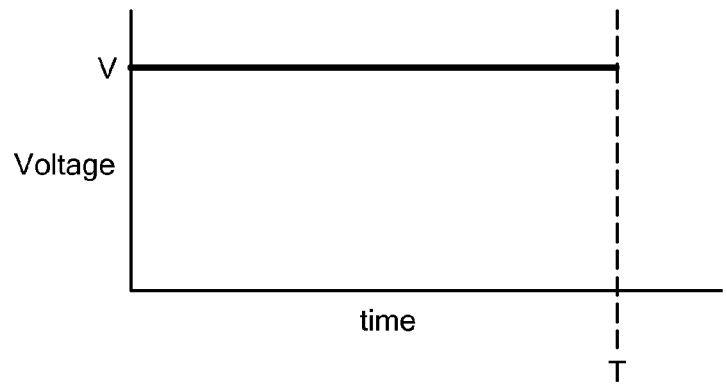
FIG. 2A-2C schematically show graphical representations of three respective techniques for transferring charge between two adjacent stages.
Figure 2B:
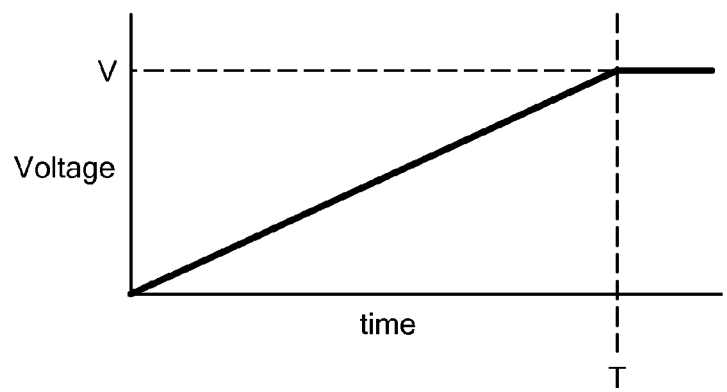
Figure 2C:
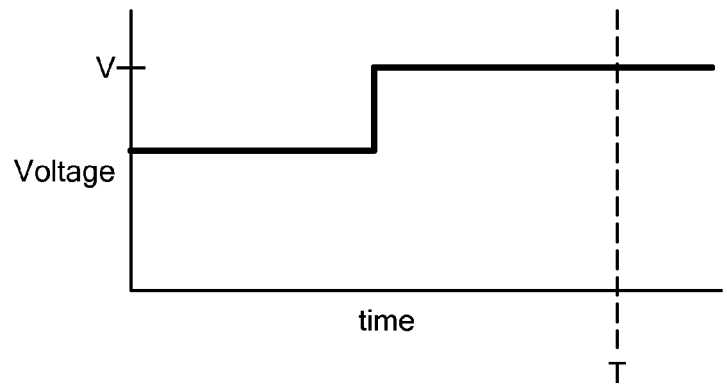

To that end, in accordance with illustrative embodiments of the invention, the charge transfer circuit 10 is configured to transfer a single quantity of charge to a single stage 20 in multiple consecutive charging steps. More specifically, this configuration takes advantage of the square of the charge to substantially reduce energy loss. FIGS. 2A-2C illustrate this concept, which graphically represent three different ways of transferring a voltage "V" to a single stage 20 over a given time frame "T." As known by those in the art, the voltage is directly proportional to the charge transferred according to the Equation 1:

$$V = (\text{Charge Transferred})/\text{Capacitance} \quad \text{(Equation 1)}$$

For discussion/illustrative purposes, voltage V is equal to 6 Volts and the capacitance equals 1 Farad. Ignoring units, this produces a voltage value equal to the value of the charge transferred (in this example).

FIG. 2A therefore charges the single stage 20 in one step. Accordingly, the loss of energy follows Equation 2:

$$\text{Energy Loss} = (\text{Charge Transferred})^2/(2*\text{Capacitance}) \quad \text{(Equation 2)}$$

Accordingly, in this example of transferring the exemplary voltage of 6 V, the squared portion of the numerator for equation 2 equals 36. This will be contrasted against the other examples of FIGS. 2B and 2C.

FIG. 2B shows an idealized example in which the total charge V is transferred in an infinite number of infinitesimally small increments during time T. This example thus produces an energy loss approaching zero because the voltage increments themselves approach zero, consequently causing the square of such a number to also approach zero.

FIG. 2C shows another example, which transfers charge to a single stage 20 in two consecutive steps. For this type of charge transfer, the loss of energy follows Equation 3:

$$\text{Energy Loss} = (\text{Charge Transferred})^2/(4*\text{Capacitance}) \quad \text{(Equation 3)}$$

Accordingly, in this example for transferring the exemplary voltage of 6 V, the squared charge transfer term in the numerator correspondingly is calculated in two steps—once for each charge transfer. If, for example, the first step transfers 3 V while the second step transfers a second 3 V, then the squared charge transfer term in the numerator equals 18, which is the sum of three squared+three squared. This value is half that of the squared charge transfer term as calculated by Equation 2.

Figure 3:
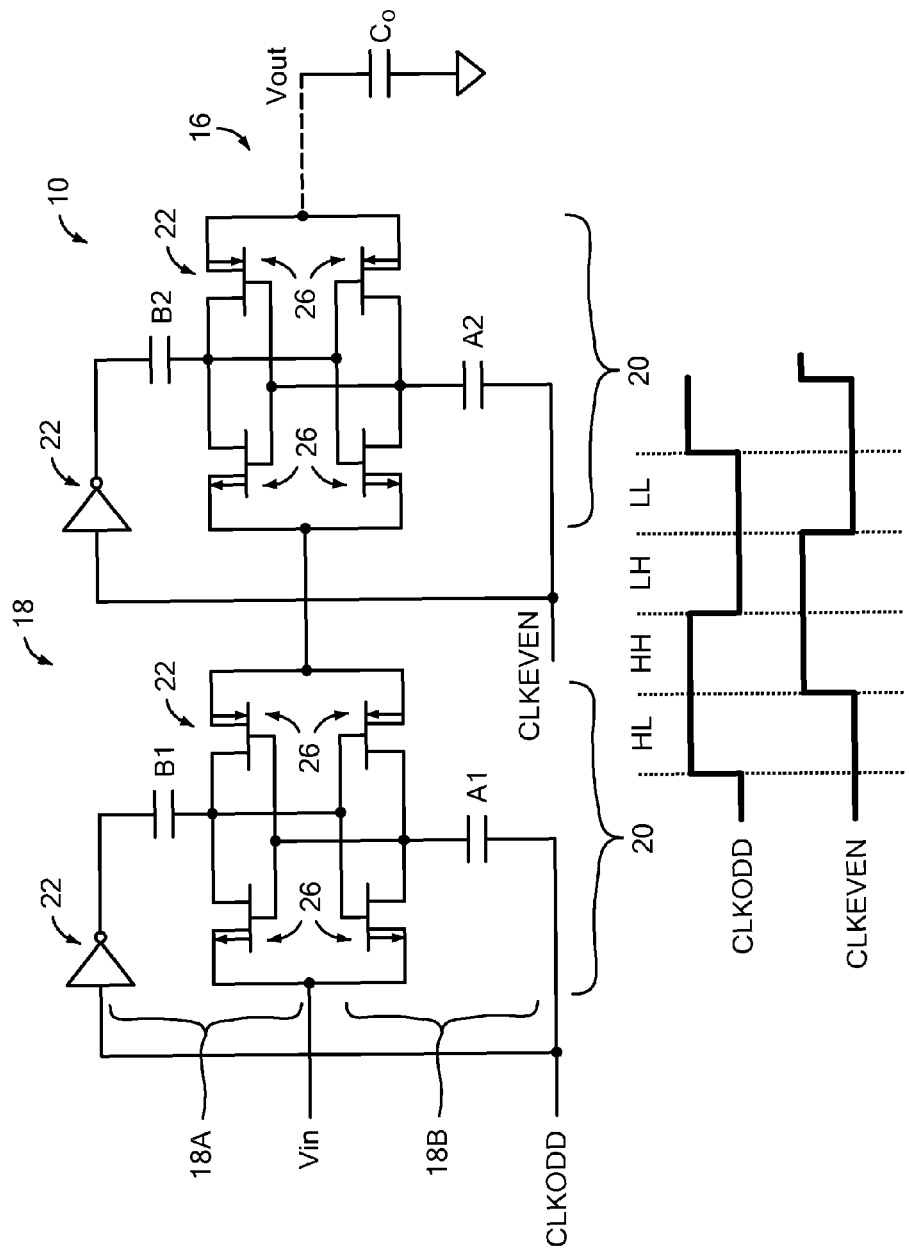
FIG. 3 schematically shows a two-stage charge pump apparatus configured in accordance with illustrative embodiments of the invention.

FIG. 3 shows a simplified schematic diagram of a two-stage charge pump apparatus 10 configured in accordance with illustrative embodiments of the invention. In general terms, the charge pump apparatus 10 may be considered as having respective top and bottom charge pump paths 18A and 18B electrically connected in parallel, and a timing circuit 22 that controls the charging and discharging of the two parallel charge pump paths 18A and 18B. In addition, the charge pump apparatus 10 also has the above noted input 12 for receiving an input voltage, and the above noted output 16 for delivering an output voltage to a load device, represented in the drawings by an output capacitor Co.

Each charge pump path 18A, 18B in this example has two capacitive stages 20 that each receives charge from a preceding stage 20 (or from the input 12) during certain cycle(s), and discharges charge to a succeeding stage 20 (or the output 16) during certain other cycle(s). These stages 20 may be considered to be switched capacitor stages 20. To that end, each switched capacitor stage 20 may include one or more capacitive elements, such as independent capacitors or groups of capacitors, which are identified by reference characters A1, A2, B1, and B2. For simplicity, each of these capacitive components may be simply referred to as "a capacitor" or "capacitors."

Each stage 20 of the top charge pump path 18A has a corresponding bottom charge pump path stage 20 on the bottom charge pump path 18B. Accordingly, the first stage 20 of the top charge pump path 18A and the first stage 20 of the bottom charge pump path 18B share common inputs and outputs (although some embodiments may not have such an arrangement). The second stage 20 of the charge pump paths 18A and 18B has the same relationship. Also as shown, the output of the first stage 20 connects with the input of the second stage, thus providing a transmission path for transferring charge from the first stage 20 to the second stage 20.

As noted above, the timing circuit 22 controls the charging and discharging of the various capacitors A1, A2, B1, and B2. To that end, the timing circuit 22 has a plurality of switches 26 and inverter circuitry 28 at each stage 20 for delivering appropriately timed clock signals to clock inputs CLKODD, CLKEVEN on each stage. FIG. 3 schematically shows two clock signals that should produce satisfactory results in various embodiments. In the example shown in FIG. 3 and discussed in greater detail below, both stages 20 receive a clock input signal that is high during half of its total period, and low the rest of its period. In accordance with illustrative embodiments of the invention, however, the two signals are phase shifted 90 degrees relative to one another.

Any of a number of different types of switches 26 may suffice, such as NMOS and PMOS transistors. For example, each corresponding charge pump path 18A, 18B in the first stage 20 has an NMOS transistor between its capacitor and the input (node) to that stage, and a PMOS transistor between its capacitor and the output (node) to that stage. Accordingly, in this configuration, this transistor arrangement enables a signal clock to control four switches 26 simultaneously. Namely, with reference to the first stage 20 as an example, when the timing signal is high, the PMOS transistor on the lower charge pump path 18B is on (permitting flow of charge from the capacitor A1 to the next stage), while the NMOS transistor of the lower charge pump path 18B is off (preventing charging from the input 12 to the capacitor A1). In contrast, the inverter circuitry 28 for that same stage 20 causes the opposite effect with a top charge pump path 18A. Namely, the NMOS transistor is on (permitting flow of charge from the input 12 into the capacitor B1), while the PMOS transistor is off (prevent flow of charge from the capacitor B1).

It nevertheless should be noted that discussion of specific types of switches 26, capacitors, and other components are for illustration only and not intended to limit various embodiments of the invention. It also should be reiterated that the circuit is a simplified schematic diagram and thus, may have additional components to optimize performance. For example, the circuit may have additional transistors, resistors, and/or capacitors. Moreover, as discussed in greater detail below, the circuit may have additional stages 20, and may be configured for use with different clock signals.

Figure 4A:
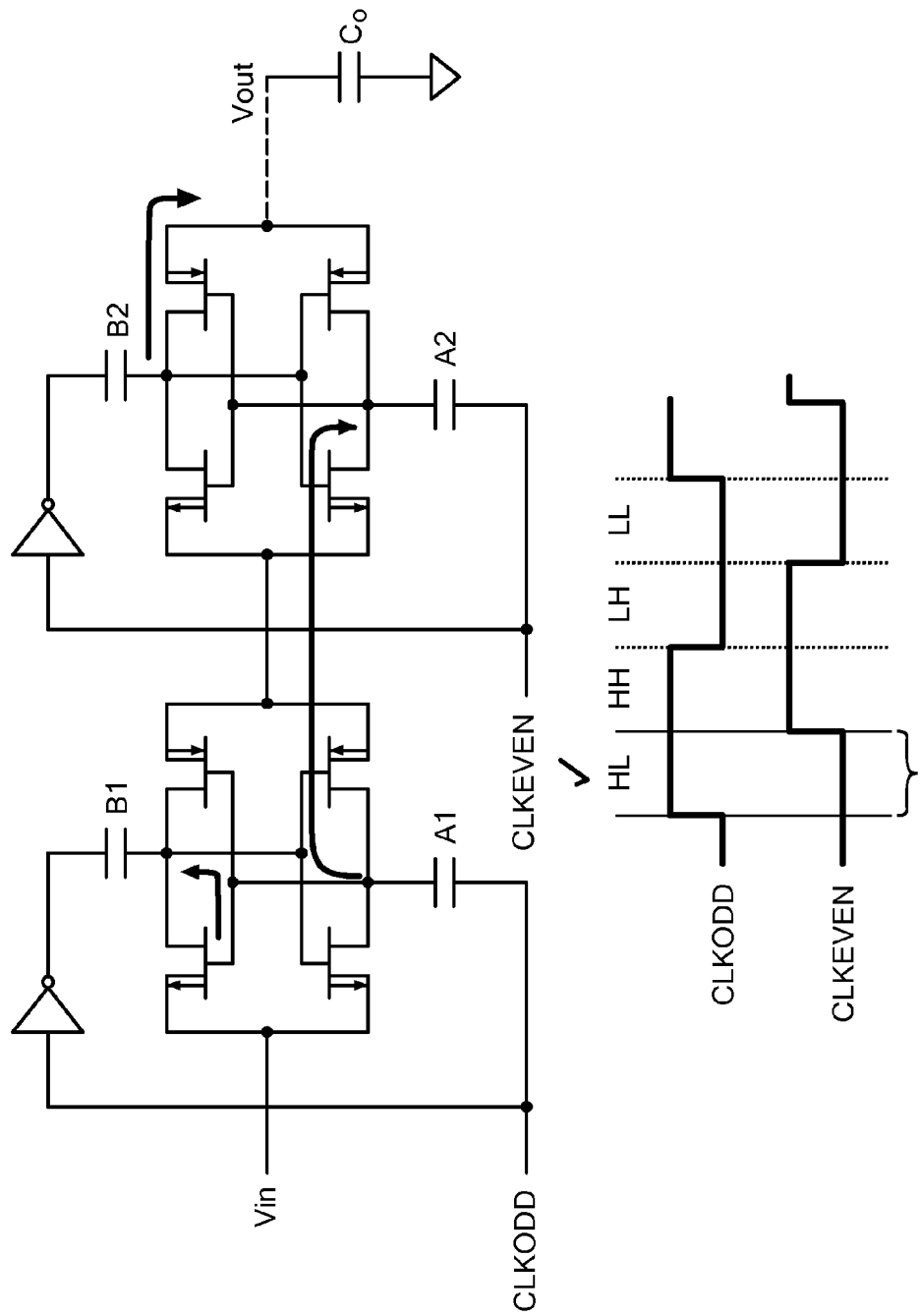
FIGS. 4A-4D schematically show the charge pump apparatus of FIG. 3 at different stages of the charge transfer process.
Figure 4B:
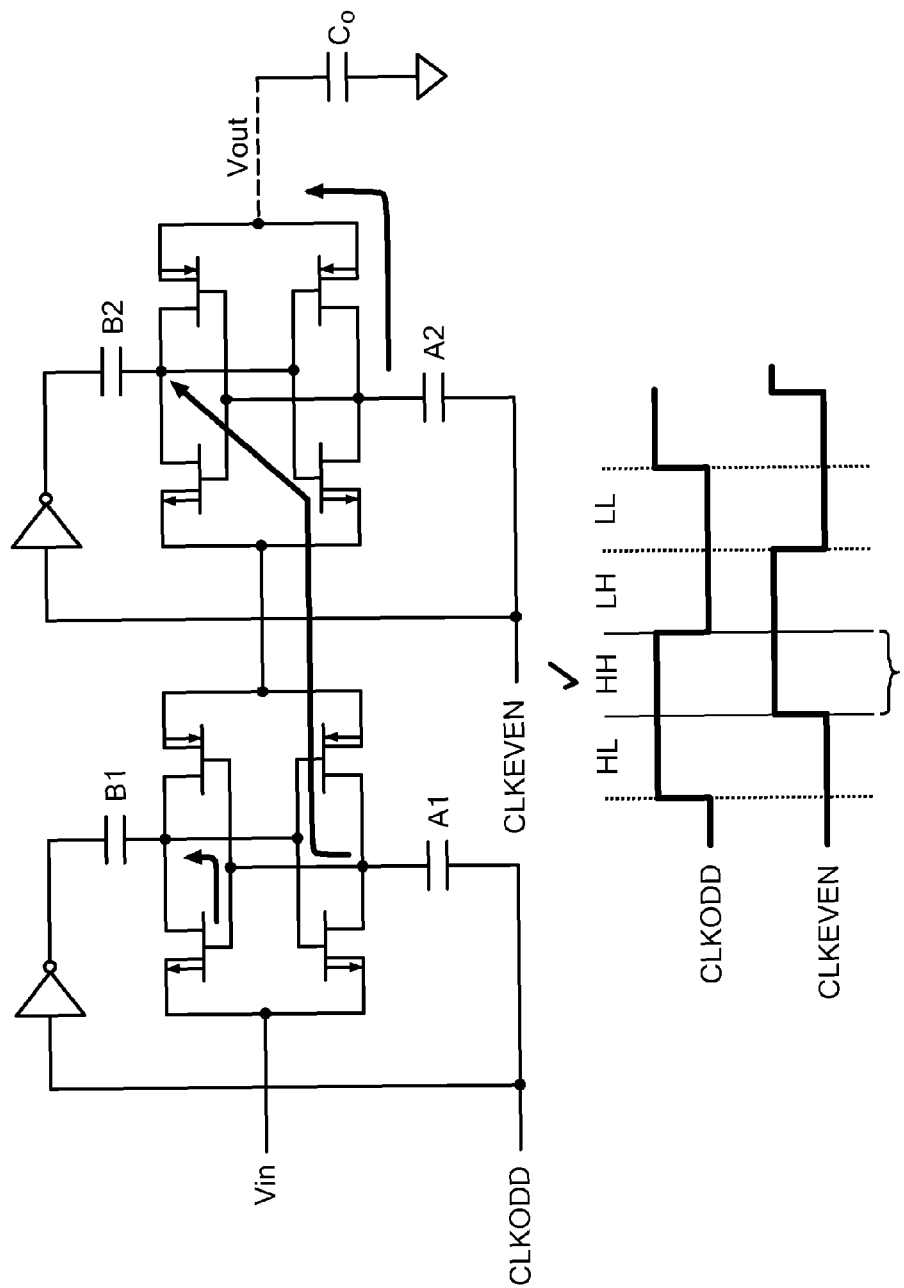
Figure 4C:
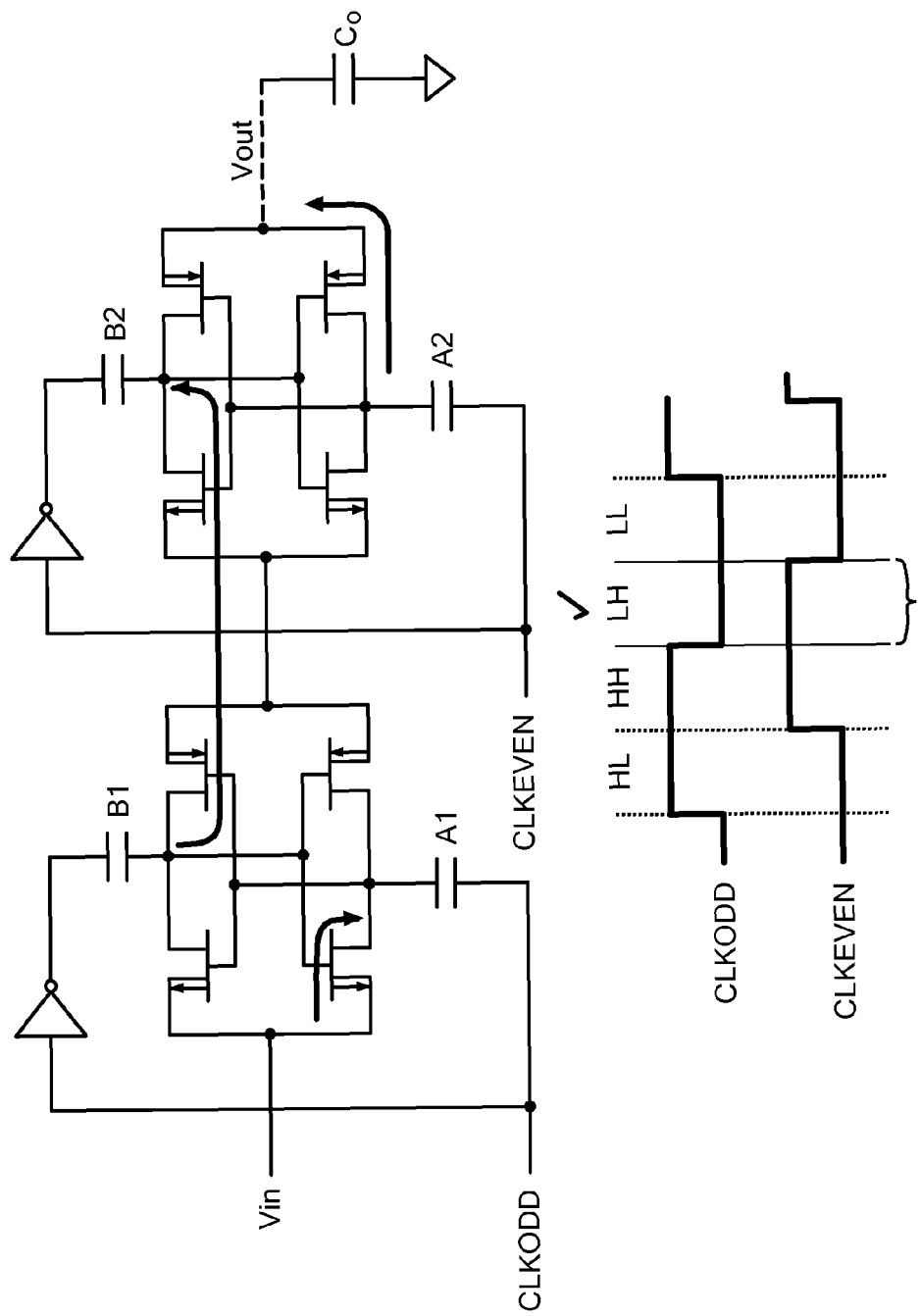
Figure 4D:
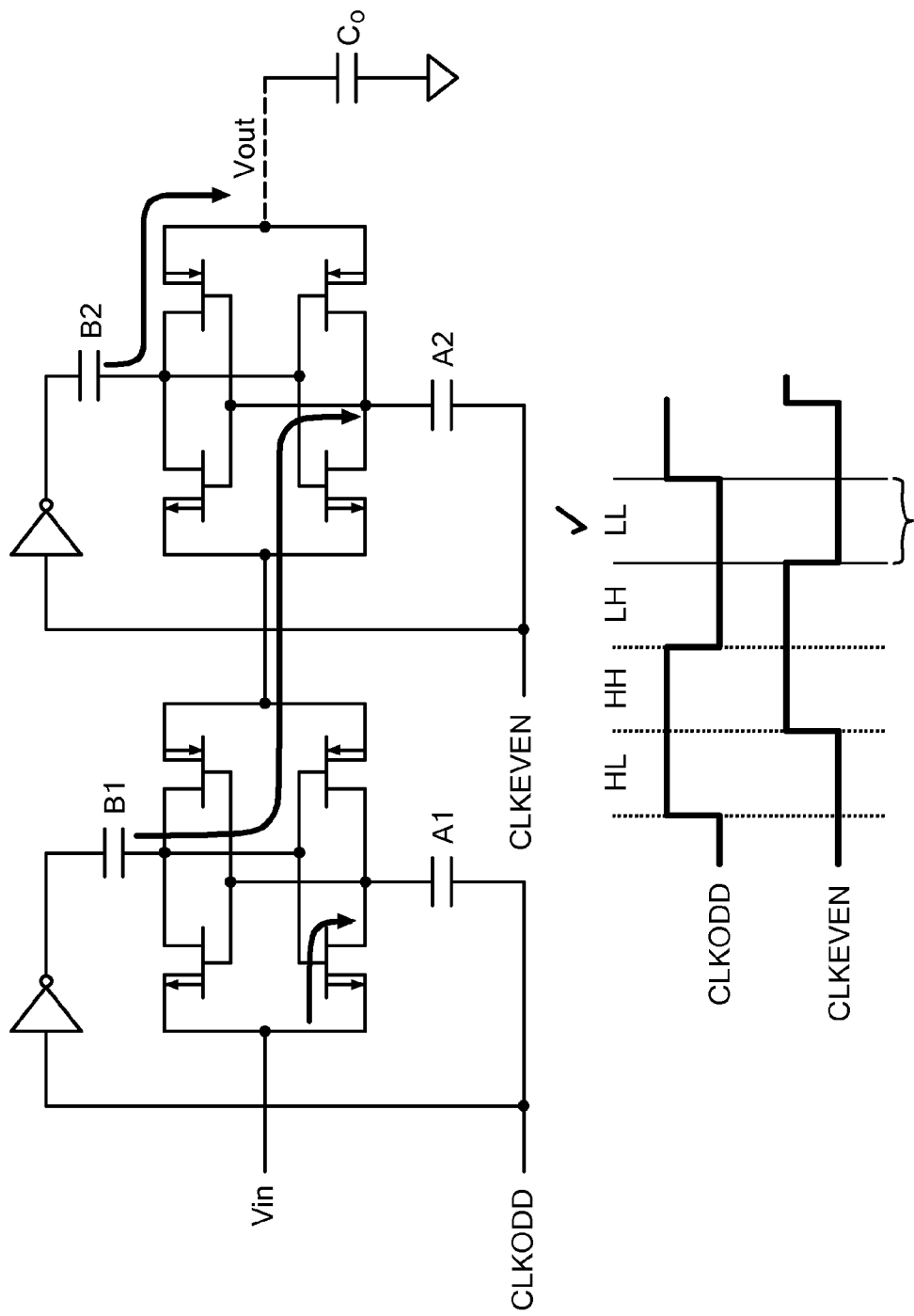

FIGS. 4A-4D schematically show the charge pump apparatus 10 of FIG. 3 at different stages 20 of the charge transfer process using clock signals CLKODD and CLKEVEN, which are out of phase by ninety degrees. The process may be considered to be broken down into four separate steps identified in the drawings as follows:
1) HL: CLKODD is high (on) and CLKEVEN is low (off) (FIG. 4A),
2) HH: Both clocks are high (FIG. 4B),
3) LH: CLKODD is low and CLKEVEN is high (FIG. 4C),
4) LL: Both clocks are low (FIG. 4D).

To simplify this discussion, the component values are selected so that Q/C=1, and the clock signals are ideal square waves swinging between ground and Vin. As such, capacitors being charged receive their full charge in two consecutive increments (i.e., in two consecutive steps). In addition, the output voltage Vout is three times the input voltage Vin. Both the input voltage Vin and output voltage Vout preferably are constant throughout this process.

Beginning at FIG. 4A, the CLKODD signal is high and the CLKEVEN signal is low (the "HL" step). This causes one capacitor in each charge pump path 18A, 18B to charge, and the other capacitor in each charge pump path 18A, 18B to discharge. The arrows in FIG. 4A show this charging and discharging. Accordingly, in the first stage, capacitor B1 is being charged by the input voltage Vin, while capacitor A1 is discharging to capacitor A2 in the next stage of its charge pump path 18B. The voltage transferred from the capacitor A1 to capacitor A2 is boosted by the voltage received by the Clkodd signal. Thus, this boosted (i.e., higher) voltage is transferred to the next stage in two steps (this step and step LL, discussed below with regard to FIG. 4D). The voltage provided to the output Vout by capacitor B2 also is boosted by the voltage of the clock Clkeven signal.

At the next step, shown in FIG. 4B, both signals are high (the "HH" step). Accordingly, both capacitors A1 and A2 in the lower charge pump path 18B are discharging while both capacitors B1 and B2 are charging. Of interest is the fact that a capacitor in the lower charge pump path 18B charges a capacitor in the top charge pump path 18A. Specifically, capacitor A1 charges capacitor B2 during this step. This is contrary to prior art charge pump apparatuses known to the inventors, which permit charging only between capacitors of the same charge pump path. Thus, capacitor A1 discharges its boosted voltage to capacitor B2 during this step. In a similar manner, capacitor A2, which received boosted voltage from capacitors A1 and B1 in prior cycles, further receives a boosted voltage from the voltage provided by the clock signal Clkeven, which is delivered in part to the output Vout during this step. As noted above, in this example, the output voltage Vout is about three times the input voltage Vin.

At the next step, shown in FIG. 4C, the CLKODD signal is low and the CLKEVEN signal is high (the "LH" step). This is a conventional type of charging with charging between capacitors of the same charge pump path 18A, 18B. It should be noted that this step continues charging the capacitor B2, but with capacitor B1. Accordingly, in two consecutive steps, the circuit charged capacitor B2 by consecutively transferring charge from capacitor A1 (FIG. 4B) and capacitor B1 (FIG. 4C). This should have the noted impact on reducing energy loss. In addition, the voltage transfer to capacitor A2 by capacitor B1 is boosted by the voltage provided by the clock signal Clkodd.

At the next step, shown in FIG. 4D, both signals are low (the "LL" step). This step begins a first of two consecutive steps in charging capacitor A2—first from capacitor B1 and, in a next step, from capacitor A1 (FIG. 4A, repeating the process). In a manner similar to the HH step, a capacitor in one charge pump path 18A charges a capacitor in the other charge pump path 18B. In this case, the capacitor B1 of the top charge pump path 18A charges the capacitor A2 of the bottom charge pump path 18B. In addition, the boosted voltage delivered through capacitor B2 to the output Vout is further boosted by the voltage of clock signal Clkeven.

This cycle continues to the HL step, shown in FIG. 4A and discussed above. As noted, this already discussed HL step completes the second of two steps in charging capacitor A2. Accordingly, this should improve the energy loss in the manner discussed above.

Figure 5:
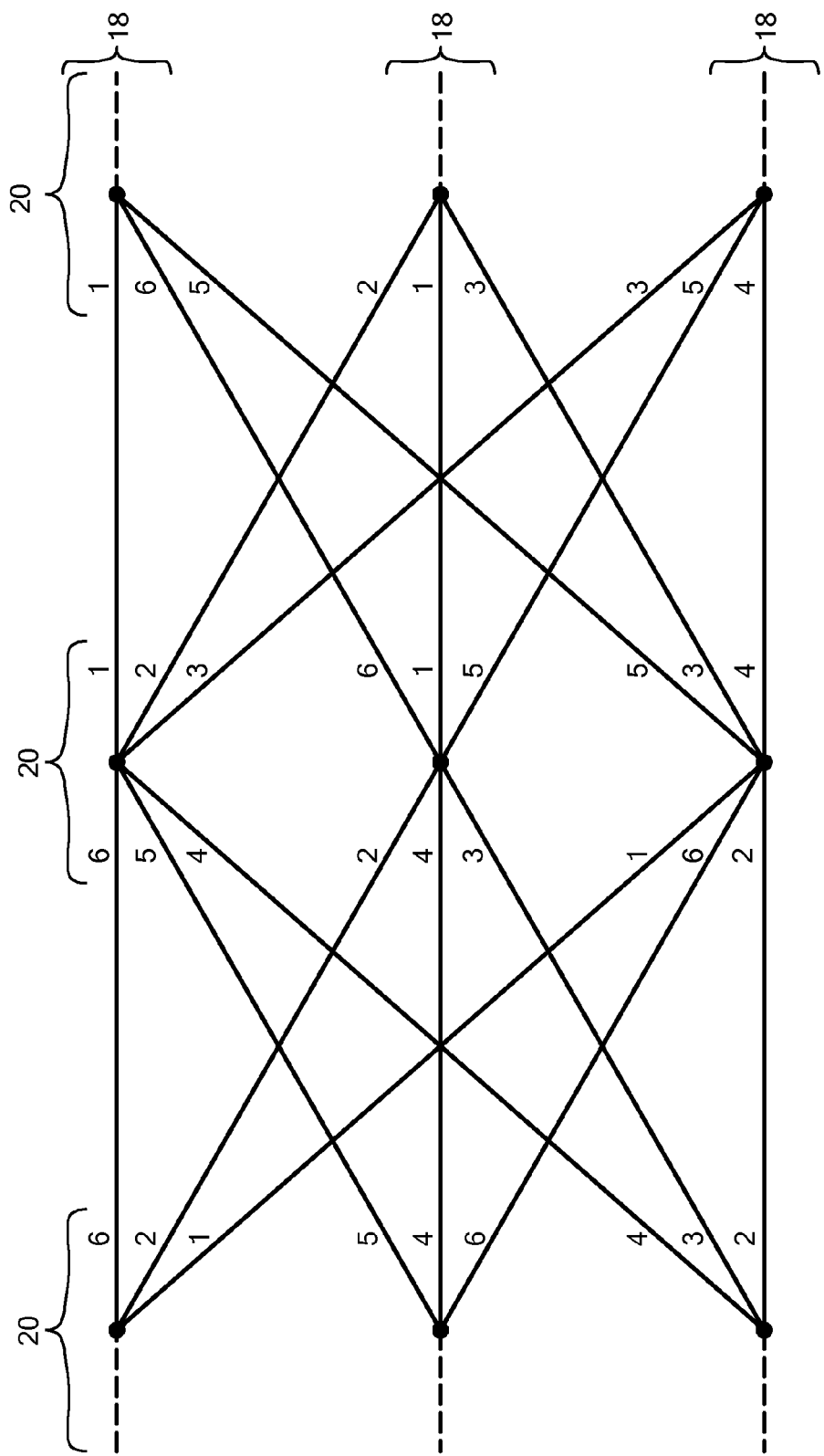
FIG. 5 schematically shows a three stage charge pump apparatus using three charging steps.

As noted, the principles discussed with regard to two charge pump paths 18A and 18B each having two stages 20 charging their capacitors in two consecutive steps can be applied to different numbers of charge pump paths with different numbers of stages 20 and/or steps. FIG. 5 schematically shows one embodiment using three stages 20 and six total steps. This is in contrast to the embodiment discussed with regard to FIG. 4A-4D, which discusses two stages 20 and therefore four total charging steps. More specifically, unlike FIG. 4A-4D, which uses two consecutive steps to charge either of the capacitors A2, B2, this embodiment uses three consecutive steps to charge a single capacitor.

To simplify the drawing and still illustrate the point, each dot/node is considered to be a capacitor of a single stage/charge pump path, while each line segment represents a switch and connection to other capacitors. Three dots in a row represent a single charge pump path (identified generically by reference number 18). This embodiment therefore has three charge pump paths 18. The number next to each line at each dot represents the step at which charge either is received by or transmitted to another capacitor (or the input 12 or output 16, whatever the case may be). In particular, charge moves in the drawing from left to right. Accordingly, the center capacitor of the top charge pump path 18 receives charge from preceding capacitors at cycles four, five, and six, and discharges charge to succeeding capacitors at cycles one, two, and three. This capacitor therefore receives charge in three consecutive cycles, thus further improving the energy efficiency of the circuit.

Figure 6:
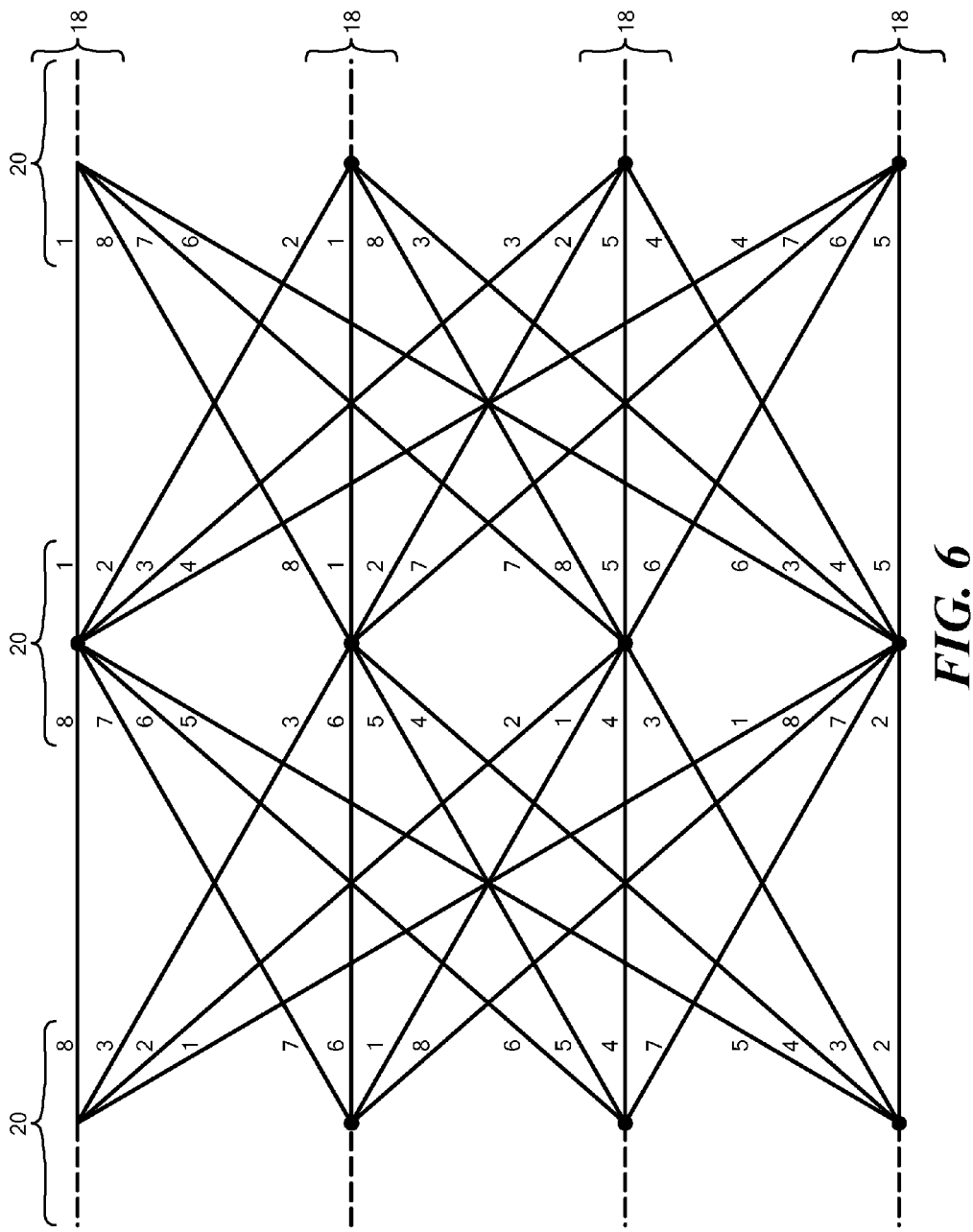
FIG. 6 schematically shows a three stage charge pump apparatus using four charging steps.

FIG. 6 schematically shows another circuit in the same style as FIG. 5, but instead using four charge pump paths 18 and eight total steps. As such, each capacitor is charged in four consecutive steps, thus even further improving energy efficiency of the circuit.

Determining the appropriate number of steps required to adequately charge a capacitor in 2, 3, 4, or more consecutive steps is important. To that end, the inventors discovered that a single period should be divided into two times the total number of desired consecutive (charging) steps. Thus, the embodiment shown in FIG. 3, which charges in two consecutive charging steps, divides the signal into four total steps. In a corresponding manner, the embodiments shown in FIGS. 5 and 6, which respectively charge capacitors in three and four consecutive steps, respectively divide their clock periods into six and eight total steps (also referred to as "cycles").

Figure 7:
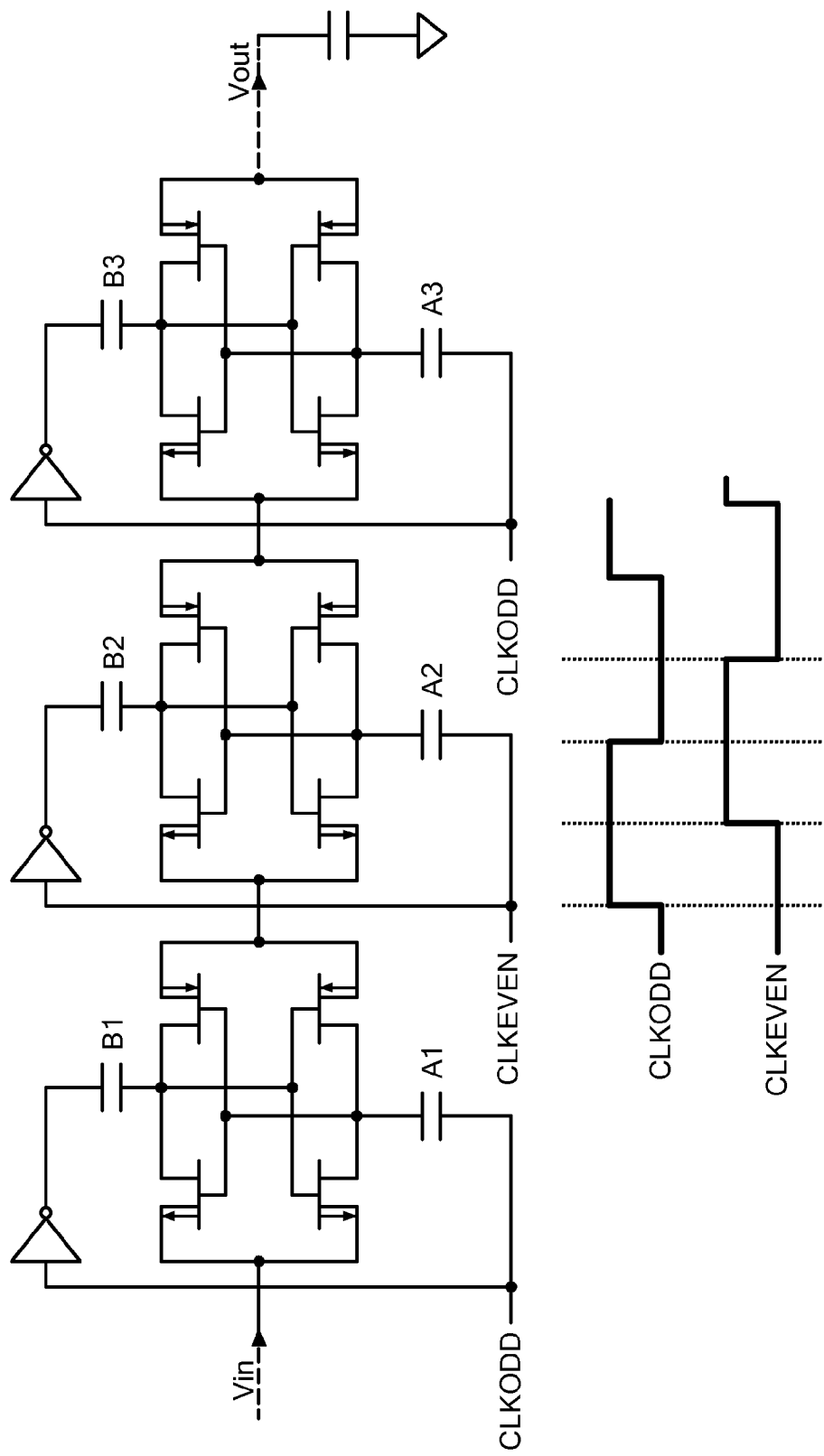
FIG. 7 schematically shows a three stage charge pump apparatus that may implement illustrative embodiments of the invention.

FIG. 7 schematically shows another embodiment using two charge pump paths 18 that each has three stages 20 in parallel. In a manner similar to the embodiment shown in FIG. 3, this embodiment uses the same clock signals CLKODD and CLKEVEN, and charges its respective capacitors in two consecutive steps.

Rather than have multiple charge pump paths, some embodiments use a single charge pump path that charges switched capacitor arrangements in multiple steps from a transmitting switched capacitor arrangement in another stage.

Accordingly, the inventors discovered that by varying the timing of the system, they could better control capacitor charging. Varying the timing may cause multiple channels of individual charge pump paths 18 to charge each other in the process. These processes consequently permit multiple smaller charge transfers, thus improving the energy efficiency of the overall charge pump apparatus 10. Other embodiments contemplate other techniques to transfer charge in smaller, consecutive increments between stages of a charge pump.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus for transferring charge, the apparatus comprising:
    an input and an output;
    a plurality of charge pump stages between the input and the output, each stage having two switched capacitor arrangements; and
    a timing circuit coupled with each of the plurality of charge pump stages,
    for a given charge pump stage, the timing circuit configured to cause at least one of its two switched capacitor arrangements to receive charge from both switched capacitor arrangements of another charge pump stage,
    the timing circuit being configured to control the at least one switched capacitor arrangement of the given charge pump stage to receive charge from both of the switched capacitor arrangements of the other charge pump stage before discharging.

2. The apparatus as defined by claim 1 wherein each of the switched capacitor arrangements in a single stage of any of the plurality of stages are part of separate charge pump paths.

3. The apparatus as defined by claim 1 wherein the timing circuit is configured to cause charging of at least one of the switched capacitor arrangements in the given charge pump stage in two or more consecutive steps.

4. The apparatus as defined by claim 3 wherein the timing circuit is configured to generate and deliver a first clock signal to a plurality of the charge pump stages, the timing circuit being configured to divide each of a plurality of periods of the first clock signal into a total number of steps equaling two times the total number of consecutive charging steps.

5. The apparatus as defined by claim 1 wherein the timing circuit generates first and second clock signals for driving the plurality of charge pump stages, the first and second clock signals being about ninety degrees out of phase.

6. An apparatus for transferring charge, the apparatus comprising:
    a first charge pump path comprising a plurality of stages having first capacitors;
    a second charge pump path in parallel with the first charge pump path, the second charge pump path having a plurality of stages having second capacitors, the first and second charge pump paths being coupled with a common output node; and
    a timing circuit coupled with the first and second charge pump paths,
    the timing circuit configured to cause at least one of the first capacitors to periodically charge at least one of the second capacitors, the at least one of the second capacitors being switchably connected with the output node,
    the timing circuit configured to charge a given one of the plurality of first capacitors in two or more consecutive charging steps before discharging.

7. The apparatus as defined by claim 6 wherein the first charge pump path comprises at least two first stages, and the second charge pump path comprises at least two second stages, each stage of the first charge pump path having a corresponding stage of the second charge pump path with a common input node and a common output node.

8. The apparatus as defined by claim 6 wherein the timing circuit generates first and second clock signals for driving the charge pump paths, the first and second clock signals being about ninety degrees out of phase.

9. The apparatus as defined by claim 8 wherein the timing circuit delivers the first clock signal to the first charge pump path, and an inverted version of the first clock signal to the second charge pump path, the inverted version being about 180 degrees out of phase with the first clock signal.

10. The apparatus as defined by claim 6 wherein the timing circuit is configured to cause the given capacitor to receive charge in a first charging step from one of the plurality of first capacitors, and receive charge in a second charge in a second consecutive step from one of the plurality of second capacitors before discharging.

11. The apparatus as defined by claim 6 wherein the timing circuit is configured to generate and deliver a first clock signal to the first charge pump path, the timing circuit being configured to divide each of a plurality of periods of the first clock signal into a total number of steps equaling two times the total number of charging steps.

12. The apparatus as defined by claim 6 wherein the timing circuit is configured to charge a given one of the plurality of the first capacitors in three or more consecutive charging steps before discharging.

13. The apparatus as defined by claim 6 wherein the first charge pump path comprises three or more stages and the second charge pump path comprises three or more corresponding stages.

14. A method of transferring charge between an input and an output of a circuit, the method comprising:
providing a first charge pump path and a second charge pump path between an input and an output, the first and second charge pump paths forming a plurality of stages that each have first and second switched capacitor arrangements, each stage having a stage input and a stage output; and
transmitting charge from a first switched capacitor arrangement of a transmitting stage to a first switched capacitor arrangement of a receiving stage, the first switched capacitor arrangement of the transmitting stage and receiving stage being part of the first charge pump path;
after transmitting charge from a first switched capacitor arrangement of the transmitting stage and before discharging the first switched capacitor arrangement of the receiving stage, transmitting charge from a second switched capacitor arrangement of the transmitting stage to the first switched capacitor arrangement of the receiving stage.

15. The method as defined by claim 14 further comprising:
driving the first and second charge pump paths with first and second clock signals, the clock signals being about ninety degrees out of phase.

16. The method as defined by claim 15 further comprising delivering the first clock signal to the first charge pump path, and an inverted version of the first clock signal to the second charge pump path, the inverted version being about 180 degrees out of phase with the first clock signal.

17. The method as defined by claim 14 further comprising:
charging a given switched capacitor arrangement in a plurality of consecutive steps;
transmitting a first clock signal having a plurality of periods to a plurality of the charge pump stages; and
dividing each of the plurality of periods of the first clock signal into a total number of steps equaling two times the total number of consecutive charging steps.

18. The method as defined by claim 14 wherein the second switched capacitor arrangement of the transmitting stage is part of the second charge pump path.

19. The apparatus as defined by claim 6 wherein the timing circuit is configured to cause at least one of the first capacitors to periodically charge at least two of the second capacitors, the at least two second capacitors being in different stages.

\* \* \* \* \*